(12) United States Patent
Richards

(10) Patent No.: US 6,710,927 B2
(45) Date of Patent: Mar. 23, 2004

(54) MULTI-MODE DISPLAY DEVICE

(76) Inventor: Angus Duncan Richards, 5016 Kelly St., Los Angeles, CA (US) 90066

( * ) Notice: Subject to any disclaimer, the term of this patent is extended or adjusted under 35 U.S.C. 154(b) by 165 days.

(21) Appl. No.: 09/892,084

(22) Filed: Jun. 25, 2001

(65) Prior Publication Data

US 2001/0055152 A1 Dec. 27, 2001

Related U.S. Application Data

(60) Provisional application No. 60/213,888, filed on Jun. 26, 2000.

(51) Int. Cl.[7] .............................................. G02B 27/14
(52) U.S. Cl. ..................... 359/630; 359/630; 359/632; 359/629
(58) Field of Search ................................. 359/630, 629

(56) References Cited

U.S. PATENT DOCUMENTS

| | | | | |
|---|---|---|---|---|
| 5,459,612 A | * | 10/1995 | Ingleton | ..................... 359/630 |
| 5,706,136 A | * | 1/1998 | Okuyama et al. | ........... 359/630 |
| 5,708,529 A | * | 1/1998 | Togino et al. | .............. 359/630 |
| 5,818,641 A | * | 10/1998 | Takahashi | .................... 359/629 |
| 5,892,598 A | * | 4/1999 | Asakawa et al. | ............. 359/13 |
| 6,219,186 B1 | * | 4/2001 | Hebert | ....................... 359/618 |

* cited by examiner

*Primary Examiner*—Ricky Mack
*Assistant Examiner*—Brandi N Thomas
(74) *Attorney, Agent, or Firm*—Richard D Fuerle

(57) ABSTRACT

The present invention relates generally to various arrangements of optical and electronic components to form a high-resolution helmet mounted display (HMD) or other compact display device. In particular, the current invention is designed in such a way as to allow it to operate utilizing several different kinds of image generation device and to incorporate many different features including the option of "eye tracking".

28 Claims, 4 Drawing Sheets

MULTI-MODE HMD
(PREFERRED EMBODIMENT)

PLAN VIEW:

ELEVATION:

ALTERNATIVE HMD EMBODIMENT ("see-through" mode)

PLAN VIEW:

ALTERNATIVE OPTICAL CONFIGURATIONS
(polarizer options)

ELEVATION:

ELEVATION:

ALTERNATIVE OPTICAL CONFIGURATIONS
(focusing alternatives)

ELEVATION:

ELEVATION:

MULTI-MODE DISPLAY DEVICE

CROSS REFERENCE TO RELATED APPLICATIONS

This application claims priority of U.S. provisional patent No. 60/213,888 titled "Multi-Mode Display Device" filed Jun. 26, 2000 by Angus Duncan Richards.

BACKGROUND OF THE INVENTION

The present invention relates generally to various arrangements of optical and electronic components to form a high-resolution helmet mounted display (HMD) or other compact display device. In particular, the current invention is designed in such a way as to allow it to operate utilizing several different kinds of image generating devices and to incorporate many different features including the option of "eye tracking".

Recently there have been several major breakthroughs in display generation technology. These breakthroughs have occurred in the fields of active matrix liquid crystal display (AMLCD), ferroelectric display (FED) technology and a new technology known as liquid crystal on silicon (LCOS). Display devices will soon be emerging with extended graphics array (XGA) and super extended graphics array (SXGA) performance. At this time, it is uncertain which technology will prevail in the HMD market.

SUMMARY OF THE INVENTION

The HMD design of this invention works equally well with both transmissive and reflective technologies. When used with a transmissive AMLCD type display device, the HMD design allows the generation of a full stereoscopic (separate image to each eye) image from a single display device. This is achieved by "time-multiplexing" the use of the display device between the two eyes. When used with a reflective display technology such as FED or LCD on silicon device, a separate display chip is required for each eye. In addition to the versatility of this display configuration to utilize either of these display technologies, it is also possible to utilize both of these display technologies simultaneously. In such a situation, the images produced would consist of an "optical overlay" of the images generated by the FED and AMLCD devices. Under certain circumstances this configuration can yield great benefits. For example, it would be possible to provide a large panoramic field of view in relatively low resolution (perhaps in monochrome) and use the reflective displays to provide a smaller high-quality field of view as a subset of this larger field image. It is also possible utilizing this unique HMD design to combine multiple fields of view utilizing pairs of similar display technology. For example, one can utilize a pair of transmissive AMLCD displays (2 displays for each eye) or a pair of FED displays for each eye.

With the growing interest in "-augmented reality-" and virtual reality based CAD there is a growing demand for new and more efficient man-machine interface tools. One of the most sophisticated user interface tools is that of the "eye cursor" or "eye tracking device." Such "eye cursor" technology calculates the precise direction that each eye is pointing and mathematicallly calculates the "target" that is being viewed. This technology is inherently three-dimensional and represents an ideal interface tool for 3-D virtual worlds and augumented reality. The unique design of this HMD allows the incorporation of eye tracking in addition to the display tasks normally associated with an HMD. In addition, the imaging technology that comprises the eye tracking system can be used to overcome one of the major problems with lens-based HMD designs, which is the ability to automatically accommodate viewers with different inter-ocular spacing (spacing between the eyes). Most off-the-shelf HMD's which are utilizing a lens-based design require manual inter-ocular adjustment for each viewer. This adjustment is often difficult and time-consuming, both of which are factors that make such HMD's inappropriate for public use. By utilizing the imaging hardware of the eye tracking system as feedback, an automatic or servo-controlled inter-ocular adjustment can be readily achieved. Interestingly, such precise inter-ocular adjustment are an essential requirement for the correct operation of most eye tracking hardware. In this way, both hardware requirements are met and are mutually symbiotic.

In certain situations, a "see-through" augmented reality HMD design is preferable to a fully enclosed virtual reality configuration. In such a situation it is possible to configure the HMD design described in this specification to "see-through-mode" by replacing the eye tracking video cameras with corrective optics. This will allow the user to see virtual objects superimposed upon the real world images at the cost of losing the eye tracking and automatic inter-ocular adjustment features of the design. An alternative configuration which achieves many of the same objectives is simply to include two miniature video cameras as part of the HMD design. These cameras would provide "real-time" video feeds which can be digitally combined with the "virtual objects" displayed in the HMD. It would of course be possible to provide the same monoscopic video signal from a single miniature video camera to both eyes of the HMD. However, this would preclude the use of eye tracking for all but the virtual objects displayed in the system because eye-tracking inherently requires the stereoscopic images to provide the required three-dimensional information.

In many ways, this electronic equivalent of "see-through mode" is actually superior to the simplistic optical approach as it inherently avoids the problems of "transport lag" and "-positional inaccuracies-" associated with optical superimposing of virtual objects. This is possible because the same "live video feeds" are being used to determine the spatial points of reference for the projection of the virtual objects. Therefore, any "transport lag" and/or "positional inaccuracies between the "real world" and the "virtual world" are not perceived by the user because they are common to both the background and the virtual objects projected upon it. In effect, the user is working entirely within a "virtual environment".

DESCRIPTION OF THE PREFERRED EMBODIMENTS

Figure 1:
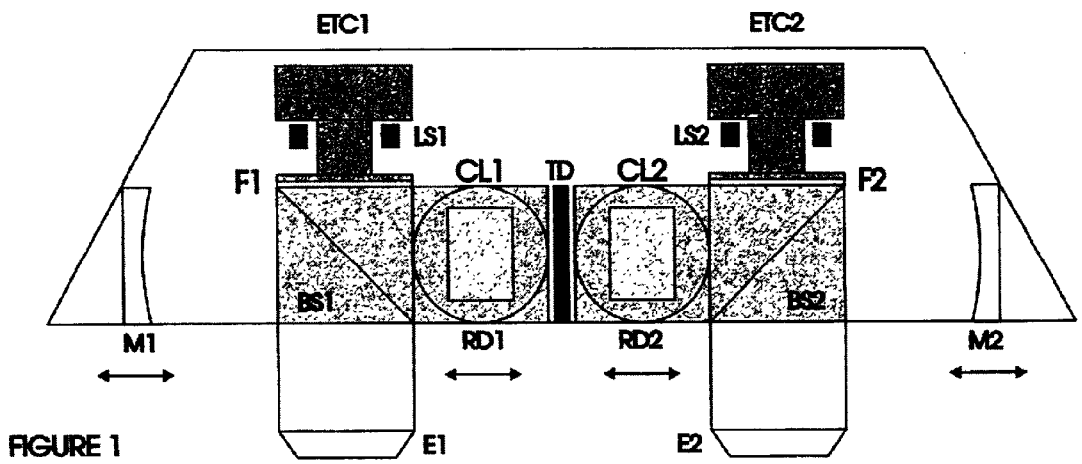
FIG. 1 is a plan view of a certain presently preferred embodiment of a multi-mode display device according to this invention and illustrates both the reflective mode (Mode 1) and the transmissive mode (Mode 2) of the invention.
Figure 2:
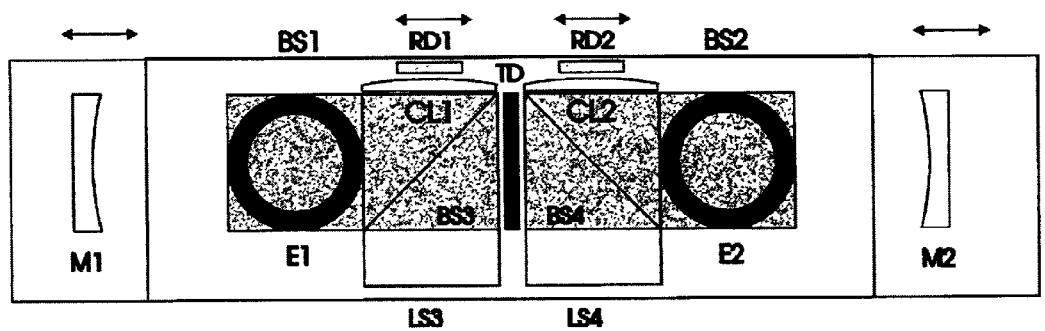
FIG. 2 is an elevation view of the multi-mode display device shown in FIG. 1.
Figure 3:
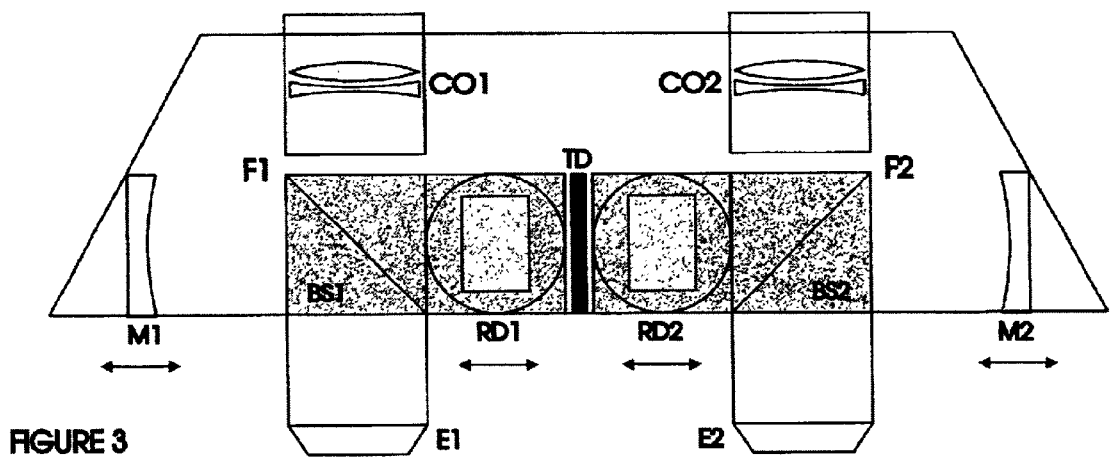
FIG. 3 is a plan view of an alternative certain presently preferred embodiment of a multi-mode display device according to this invention and illustrates the "see through" mode (Mode 3) of the invention.

The preferred embodiment of this design is shown in FIGS. 1 and 2. The HMD consists of two separate optical assemblies and one optional common optical device. Optical assembly 1 consists of mirror M1, beamsplitter BS1, beamsplitter BS3, eyepiece E1, light source LS3 and optional components consisting of reflective display device RD1, collimating lens CL1, infrared filter F1, camera ETC1, and infrared light sources LS1. Optical assemably 2 is basically identical and consists of mirror M2, beamsplitter BS2, beamsplitter BS4, eyepiece E2, light source LS4 and optional components consisting of reflective display device RD2, collimating lens CL2, infrared filter F2, camera ETC2, and infrared light sources LS2. The common optical component is transmissive display device TD.

Mode 1
(Reflective Mode—Virtual Reality)

In this mode, two reflective display devices (such as FED or reflective LCOS) are used to display a separate image to each eye. The video information delivered to each display device may be purely synthetic or it may be a combination of virtual imagery and real-time video feeds. Although different configurations are possible, beamsplitters BS1 and BS2 would generally be of non-polarized type and beamsplitters BS3 and BS4 would be of broadband polarizing design. Light sources LS3 and LS4 can be of any appropriate type but would most probably be of an LED design. In this configuration, light from light source LS3 would pass through beamsplitter BS3. Only light with one plane of polarization will be allowed through beamsplitter BS3, the other plane of polarization being reflected form the hypotenuse of the beamsplitter. In this particular configuration, the optional transmissive display element TD would simply be replaced by a non-reflective baffle. Light being reflected towards this baffle would simply be absorbed. The remainder of the plane polarized light incident upon reflective display device RD1 will then selectively undergo rotation of the plane of polarization (phase retardation) depending upon the state of each individual pixel. The light that has undergone this rotation (pixels which are on) will them be reflected from the hypotenuse of beamsplitter BS3 towards beamsplitter BS1. As beamsplitter BS1 is non-polarizing, half of the light incident upon it will pass through the beamsplitter towards mirror M1 the other half of the light will reflect off the hypotenuse of beamsplitter BS1 towards infrared filter F1. As light source L3 contains no infrared component, this light will be absorbed by F1. The light that strides concave mirror M1 will form a real image at some distance from M1 such that the light from this image will once again be partially reflected from the hypotenuse of beamsplitter BS1. This reflected light will enter eyepiece E1 and form an image which is viewable by the user of the HMD.

Figure 4:
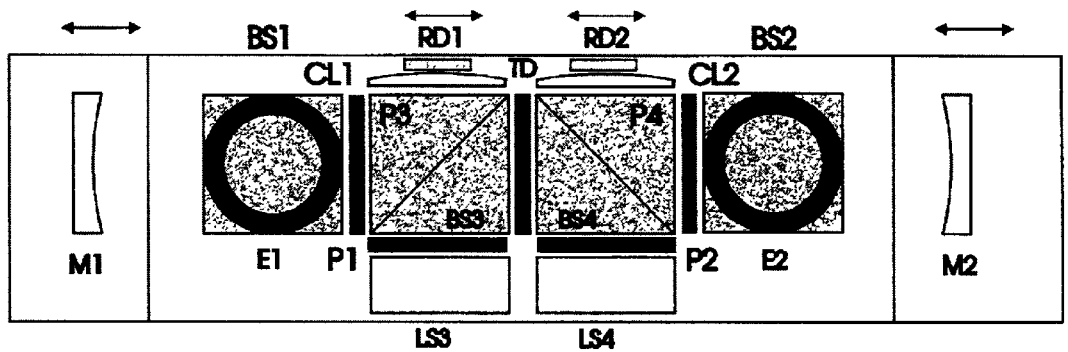
FIGS. 4 and 5 are elevation views of display devices similar to the display devices illustrated by FIGS. 1 and 2, but show polarizing options.
Figure 7:
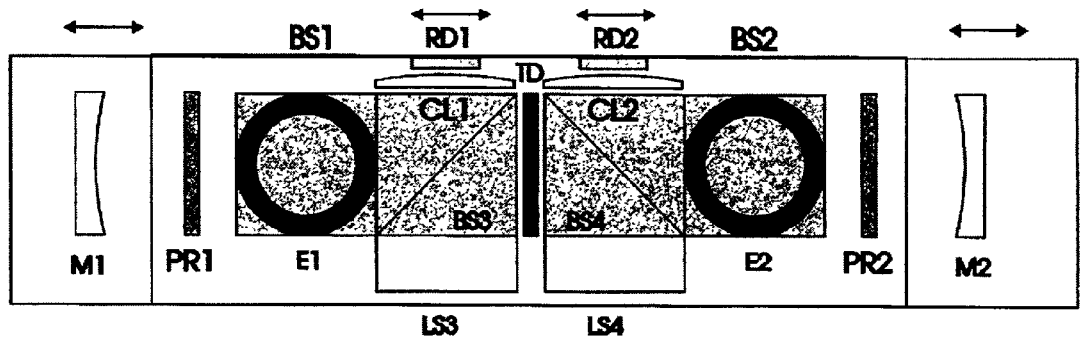

Ideally, beamsplitters BS3 and BS1 should be optically bonded together to reduce reflections. BS1 and BS2 could be of polarizing design if an additional phase retarder is placed between beamsplitter BS1 and mirror M1 (and between beamsplitter BS2 and mirror M2) as shown in FIG. 7. In fact, such a configuration will yield significantly higher optical performance. The reason why this is not considered the preferred embodiment is that polarizing beamsplitters are relatively expensive devices. It is also possible (at the cost of further reducing sytem optical efficiency) to replace beamsplitters BS3, BS4 with simple non-polarizing beamsplitters and by adding additional polarizers P1–P4 as shown in FIG. 4, which will operate in an optically similar manner.

Figure 5:
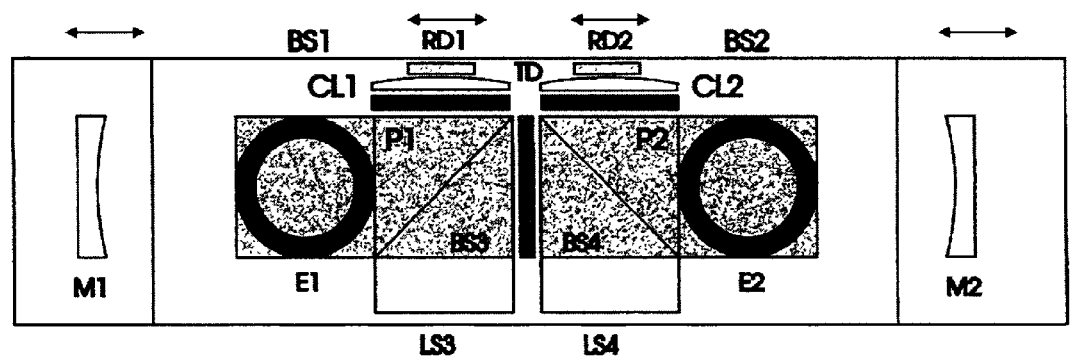

Equally valid is a somewhat simpler configuration utilizing single polarizing elements P1, P2 as shown in FIG. 5. These configurations may be preferable in a production model given that in a further modification the cube beamsplitters BS1–BS4 could potentially be replaced by simple partially silvered mirrors which are inexpensive. Reducing the overall optical efficiency may not pose a significant problem if the light sources LS3 and LS4 are sufficiently powerful. The replacement of cube beamsplitters with partially silvered mirror style beamsplitters does, however, have the disadvantage of double reflections.

The miniature video cameras ETC1, ETC2 work in conjunction with eyepiece lenses E1, E2 to form images of the user's eyes. Infrared filters F1, F2 are used to block stray light from the display chips from entering the cameras directly. Light sources LS1, LS2 can be of a variety of different sources and/or a different number of lights. However, a configuration of four infrared LED's is probably preferred. A simple configuration of 4 LED's in a square can be used to achieve both eye tracking and eye positioning (for inter-ocular adjustment). In such a configuration, the LED's will produce four distinct reflections from the cornea of the viewer's eyes. This information, in addition to the relative position of the pupil of the eye, can be used to determine the direction that the eye is pointing in three dimensions (i.e. a line of sight can be determined). The two separate lines of sight (one for each eye) can be used to locate a specific point in 3-D space. Infrared light (or near infrared) is used in preference to visible light, firstly because it allows the stray from the image projection to be easily eliminated and secondly because the use of visible light would be a constant source of irritation to the user.

In this embodiment of the HMD, eyepiece E1, beamsplitters BS1, BS3, light source LS3, and reflective display device RD1, collimating lens CL1 and camera assembly consisting of infrared filter F1, light source or sources LS1, and camera ETC1 would be physically joined together and would be free to move laterally as shown in FIGS. 1 and 2. Mirror M1 is free to move laterally on the same axes as this assembly and may or may not be physically connected to the assembly. The lateral adjustment of the aforementioned optical assembly (and its counterpart) allows for automatic adjustment of different eye spacing (inter-ocular adjustment). This adjustment would ideally be performed by some form of an electro-mechanical means such as a servo system. The independent adjustment of the position of mirror M1 will provide focus or diopter adjustment. To reduce costs, the adjustment of mirrors M1, M2 may be done manually, or alternatively the position of M1,M2 may be fixed with respect to the separate optical assemblies and focus/diopter adjustment may be made directly at the eyepieces E1, E2.

Mode 2
(Transmissive Mode—Virtual Reality)

In an alternative configuration, the reflective display devices RD1,RD2 can be replaced by a single transmissive display device (such as an AMLCD). In this configuration, stereoscopic images (a separate image to each eye) can be achieved with a single display element by "time multiplexing" the two images (i.e. by alternating quickly between each light source). This "time multiplexing" is achieved by utilizing two separate light sources LS4, LS3 for the illumination of the left and right eye images respectively. It is of course also possible to provide the same image to the left and right eyes simultaneously, simply by switching light sources LS3, LS4 on at the same time. In many ways the transmissive configuration is more efficient because only a single display element is required for the generation of two separate images. However, at the present time, reflective display technology is significantly more advanced than similar transmissive display technology. One of the major differences in the hardware configuration when a transmissive element is utilized is that there can no longer be a physical connection between beamsplitters BS1, BS3 and BS2, BS4. In this configuration beamsplitters BS3, BS4, light sources LS3, LS4 and transmissive display device TD form a single optical assembly. This leaves optical assembly-1 consisting of beamsplitter BS1, eyepiece E1 and optional components infrared filter F1, light sources LS1, and miniature camera ETC1. Optical assembly-2 consists of beamsplitter BS2, eyepiece E2, and optional components infrared filter F2, light sources LS2, and miniature camera ETC2. The operation of this modified optical assembly will be similar to that previously described, with the exception that it is now an absolute requirement that mirrors M1,M2 are adjustable independently from optical assemblies 1,2 in order to maintain the correct focal position.

Additional Enhancements

With the reflective design, the inclusion of collimating optics CL1, CL2 (as shown in FIGS. 1 to 7) can greatly improve the overall optical efficiency of the system without seriously degrading the image quality.

Mode 3

Figure 6:
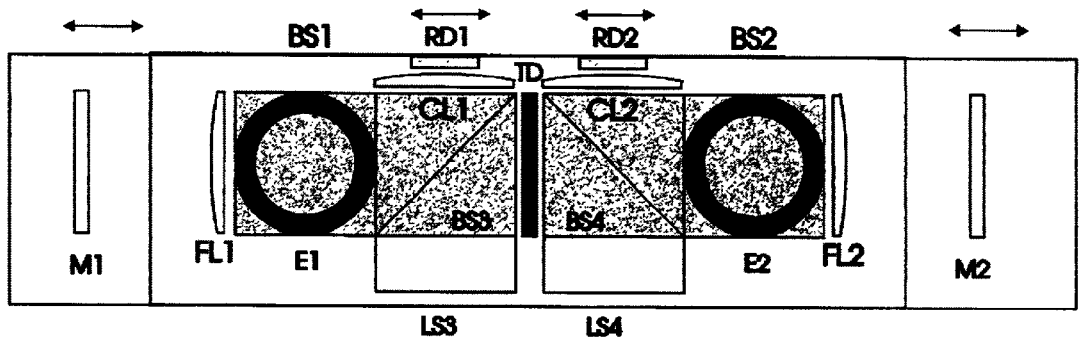
FIG. 6 and 7 are elevation views of display devices similar to the display devices illustrated by FIGS. 1 and 2, but show focusing options.

Reflective focusing optics M1, M2 can be replaced by refractive focusing optics consisting of lenses FL1, FL2 as shown in FIG. 6. Although theoretically the mirror elements could be now be eliminated from the design by simply orienting beamsplitters BS1, BS2 to reflect the light directly into eyepieces E1, E2, respectively, in practice, this would require the focusing optics FL1, FL2 to have an excessively short focal length. A more practical solution to this configuration is to replace concave mirrors M1, M2 with plain mirrors, leaving the beamsplitters BS1, BS2 as in the previous configuration. This variation in the design greatly increases the required focal length of optics FL1, FL2 which eases the design requirements.

Color Generation

The generation of color in this HMD design can be achieved with either spatial color (red/green/blue picture elements) or by temporal color (display of rapid succession of red, green, and blue image fields, usually by changing the color of the light incident on the display device), and is dependent upon the display devices utilized.

Alternative Configurations

The alternative configurations of this HMD as shown in FIGS. 1 to 7 simply highlight alternative configurations for a specific component of the overall system. It is of course possible to combine any of the configurations shown in FIGS. 1 to 7 to form an overall system with the desired characteristics.

The rotational orientation of the sub-assembly consisting of light source LS3, beamsplitter BS3, and optional components RD1, CL1 and its counterpart consisting of light source LS4, beamsplitter BS4, and optional components RD2, CL2 is not a factor defining the intellectual property, and the illustrations showing a particular configuration should not be considered a reduction in the generality of this specification.

What is claimed is:

1. A display device comprising
   (A) two pairs of beamsplitters, each pair comprising a first beamsplitter and a second beamsplitter positioned so that light exiting one beamsplitter in said pair enters the other beamsplitter in said pair;
   (B) a light source for directing a beam of light at a first beamsplitter in each pair;
   (C) means for electronically impressing an image on a portion of said beam of light that exits one of said beamsplitters in each pair and for sending said image to one of said beamsplitters; and
   (D) an eyepiece for viewing images exiting a beamsplitter in each pair.

2. A display device according to claim 1 wherein said means is a reflective display device.

3. A display device according to claim 2 wherein said reflective display device impresses an image on light that passes through said first beamsplitter in each pair.

4. A display device according to claim 1 wherein light that passes through said second beamsplitter is reflected back to said second beam splitter by a concave mirror and is reflected by said second beamsplitter into said eyepiece.

5. A display device according to claim 1 wherein light that passes through said second beamsplitter is focused by a lens, is reflected back to said second beamsplitter by a plane mirror, and is reflected by said second beamsplitter into said eyepiece.

6. A display device according to claim 1 wherein a second light source sends a beam of light through said second beamsplitter into said eyepiece where it is reflected from a viewer's eye back into a miniature video camera.

7. A display device according to claim 6 wherein said second light source emits infrared light.

8. A display device according to claim 6 including means for analyzing the position of the pupils of eyes looking into said eyepieces by using information obtained by said miniature video cameras and for changing the distance between said eyepieces in accordance with that information.

9. A display device according to claim 6 including means for determining the point in three dimensional space that eyes looking into said eyepieces are focused upon using information obtained by said miniature video cameras.

10. A display device according to claim 1 wherein said means is a transmissive display device.

11. A display device according to claim 10 wherein light reflected by said first beam splitter in a pair passes through said transmissive display device to the first beam splitter in the other pair.

12. A display device according to claim 10 wherein said transmissive display device is a liquid crystal display.

13. A display device according to claim 10 wherein time multiplexing is used to alternate beams from said light sources, said transmissive display device impressing different images on light from each light source, whereby stereoscopic images are transmitted into said eyepieces.

14. A display device according to claim 1 wherein light reflected off a real scene is optically combined with said beam, whereby a viewer looking into said eyepieces sees both said real scene and said electronically impressed image.

15. A display device according to claim 1 wherein a collimating lens is between said first beam splitter and said reflective display device which substantially collimates said beam of light.

16. A display device according to claim 1 wherein beamsplitters are partially silvered mirrors.

17. A display device according to claim 1 wherein said beamsplitters are cubic beamsplitters.

18. A display device according to claim 1 wherein the beamsplitters in each pair are at right angles.

19. A display device according to claim 1 wherein one beamsplitter in each pair is a broadband polarizing design.

20. A display device according to claim 1 wherein said beam of light is polarized by a single polarizing element.

21. A display device according to claim 1 wherein a mirror reflects light form a beamsplitter back to towards the same beamsplitter forming a real image that is viewed through said eyepiece.

22. A display device according to claim 21 wherein a phase retarder is place between said mirror and said beamsplitter.

23. A display device according to claim 1 wherein said beam of light is polarized by a single polarizing element.

24. A method of transmitting images to a viewer using a display device according to claim 1 comprising sending electronic data to said display device, enabling said light source, and viewing said images through said eyepiece.

25. A display device comprising a pair of optical components, each optical component comprising
   (A) a first light source for generating a first beam of light;
   (B) means for polarizing said first beam of light;
   (C) a reflective display device that can impress an image on a beam of light reflected therefrom;
   (D) a miniature video camera;
   (E) an eyepiece;
   (F) a first beamsplitter that can transmit one portion of a beam of light and reflect another portion of said beam of light at a 90 degree angle;
   (G) a second beamsplitter that can transmit one portion of a beam of light and reflect another portion of said beam of light at a 90 degree angle, whereby a portion of said first beam of light is transmitted by said first beamsplitter, is reflected back to said first beamsplitter by said reflective display device, and is reflected into said second beamsplitter, where a portion is transmitted to a mirror, is reflected back to said second beamsplitter, and is reflected into said eyepiece; and
   (H) a second light source for generating a second beam of light that passes through said second beamsplitter and through said eyepiece and is reflected back into said miniature video camera by a viewer's eye.

26. A method of transmitting images to a viewer using a display device according to claim 25 comprising sending electronic data to said display device, enabling said light source, and viewing said images through said eyepiece.

27. A display device comprising a first and a second optical component, each optical component comprising
   (A) a first light source for generating a first beam of light, where the light source of one optical component is off when the light source of the other optical component is on;
   (B) means for polarizing said first beam of light;
   (C) a transmissive display device that can impress an image on a beam of light passing therethrough;
   (D) a miniature video camera;
   (E) an eyepiece;
   (F) a mirror;
   (G) a first beamsplitter that can transmit one portion of a beam of light and reflect another portion of said beam of light at a 90 degree angle;
   (H) a second beamsplitter that can transmit one portion of a beam of light and reflect another portion of said beam of light at a 90 degree angle, whereby, in said first optical component, said first beam of light is reflected by the first beamsplitter through said transmissive display device and, in said second optical component, passes through the second and first beamsplitters, and is reflected by said mirror back to said first beamsplitter which reflects it into said eyepiece; and
   (I) a second light source for generating a second beam of light that passes through said second beamsplitter and through said eyepiece and is reflected back into said miniature video camera by a viewer's eye.

28. A method of transmitting images to a viewer using a display device according to claim 27 comprising sending electronic data to said display device, enabling said light source, and viewing said images through said eyepiece.

* * * * *